United States Patent
Tsacoyeanes

[19]

[11] Patent Number: 5,909,296
[45] Date of Patent: Jun. 1, 1999

[54] EFFECTIVE WIDE ANGLE BEAM STEERING USING SPHERICAL LASER DIODE ARRAYS

[75] Inventor: Charles W. Tsacoyeanes, Dedham, Mass.

[73] Assignee: The United States of America as represented by the Secretary of the Air Force, Washington, D.C.

[21] Appl. No.: 08/833,154

[22] Filed: Apr. 4, 1997

[51] Int. Cl.[6] .................................................. H04B 10/00
[52] U.S. Cl. ........................ 359/152; 359/159; 359/172
[58] Field of Search .................................. 359/152, 159, 359/163, 172; 372/50

[56] References Cited

U.S. PATENT DOCUMENTS

| | | | |
|---|---|---|---|
| 4,977,570 | 12/1990 | Hasegawa | 372/50 |
| 5,059,008 | 10/1991 | Flood et al. | 359/196 |
| 5,161,045 | 11/1992 | Hutchin | 359/197 |
| 5,204,523 | 4/1993 | Appel et al. | 250/236 |
| 5,228,103 | 7/1993 | Chen et al. | 385/14 |
| 5,243,619 | 9/1993 | Albers et al. | 372/97 |
| 5,313,542 | 5/1994 | Castonguay | 385/115 |
| 5,379,310 | 1/1995 | Papen et al. | 372/23 |
| 5,386,426 | 1/1995 | Stephens | 372/20 |
| 5,394,489 | 2/1995 | Koch | 385/14 |
| 5,416,627 | 5/1995 | Wilmoth | 359/159 |
| 5,450,510 | 9/1995 | Boord et al. | 385/37 |
| 5,483,511 | 1/1996 | Jewell et al. | 369/44.37 |
| 5,500,869 | 3/1996 | Yoshida et al. | 372/50 |
| 5,526,155 | 6/1996 | Knox et al. | 359/130 |
| 5,526,182 | 6/1996 | Jewell et al. | 359/621 |
| 5,527,732 | 6/1996 | Kasahara et al. | 437/3 |
| 5,757,528 | 5/1998 | Bradley et al. | 359/152 |
| 5,777,768 | 7/1998 | Korevaar | 359/172 |

*Primary Examiner*—Kinfe-Michael Negash
*Attorney, Agent, or Firm*—Robert L. Nathans

[57] ABSTRACT

Curved arrays of lasers cause discreet narrow infra-red light beams to be rapidly projected within a wide field of view, without requiring mechanical motion of components. Transmitted and received light beams can be modulated with data to be transmitted between light beam transceivers for covert data communication purposes, or without data for use in collision avoidance systems.

24 Claims, 2 Drawing Sheets

2

EFFECTIVE WIDE ANGLE BEAM STEERING USING SPHERICAL LASER DIODE ARRAYS

STATEMENT OF GOVERNMENT INTEREST

The present invention may be manufactured and used by or for the Government for governmental purposes without the payment of any royalty thereon.

BACKGROUND OF THE INVENTION

The present invention relates to the field of optical beam steering.

There are many important applications which call for optical beam steering. One of these applications is free space optical communications, which is important to the telecommunications, cable and satellite television industries. The military is especially interested in free space optical data communication systems which are secure.

Most current optical beam steering systems are mechanically driven systems which are complex, bulky, imprecise and expensive, and require high power to produce desired acceleration of the components thereof. The steering of these systems is relatively slow and imprecise often requiring mechanical stabilization, and such systems are sensitive to vibration and acceleration. Another approach includes the use of deformable micro-mirrors, which operate in response to electro-static field changes. Their speeds have been in the microsecond range and thus are undesirably slow, while the angular mirror deflections are quite small. A non-mechanical approach employs acousto-optic (AO) beam deflection, which is also relatively slow, performing beam deflection in microseconds, and is limited to small angles of beam deflection of a few milliradians. Another approach includes electro-optic beam deflectors which are faster, operating in the nanosecond range, but also have limitations in angular beam deflection in the milliradian range. The Government has expended considerable funds in the development of non-mechanical beam steering systems. To date, most of these approaches have employed optical phased arrays, broadly based upon RF phased array radar systems.

To date, the highest performance results for phased array systems were obtained using liquid-crystal based phased arrays. However, these systems are relatively slow, in the millisecond range, and are limited to small angular deflections of only a few degrees.

Thus, there is a need for alternate approaches employing apparatus which is rugged, and can very rapidly steer light beams accurately in a wide angle of view even up to 360 degrees without mechanical devices with their low speed and angular displacement limitations mentioned hereinabove. Rapid beam deflection, operating at speeds of about one nanosecond are desired.

BRIEF SUMMARY OF THE INVENTION

The aforesaid needs are believed to be filled in accordance with a preferred embodiment of the invention which utilizes a curved laser array of outwardly pointing lasers for rapidly directing narrow light beams in widely diverging directions, together with electronic laser actuation circuitry which has no mechanical members to be continually put in motion to perform beam steering. Curvature of the laser array substrate may be facilitated during manufacture by forming vertical emission lasers upon a flexible, readily deformable thin substrate wafer.

Covert light beam data communication systems and collision avoidance systems can be provided, incorporating the optical beam steering device of the invention, in a manner to be explained in the following description.

BRIEF DESCRIPTION OF THE DRAWINGS

The various features and advantages of the invention will become more apparent upon study of the following description, taken in conjunction with the drawings in which.

DETAILED DESCRIPTION OF PREFERRED EMBODIMENTS OF THE INVENTION

Figure 1:
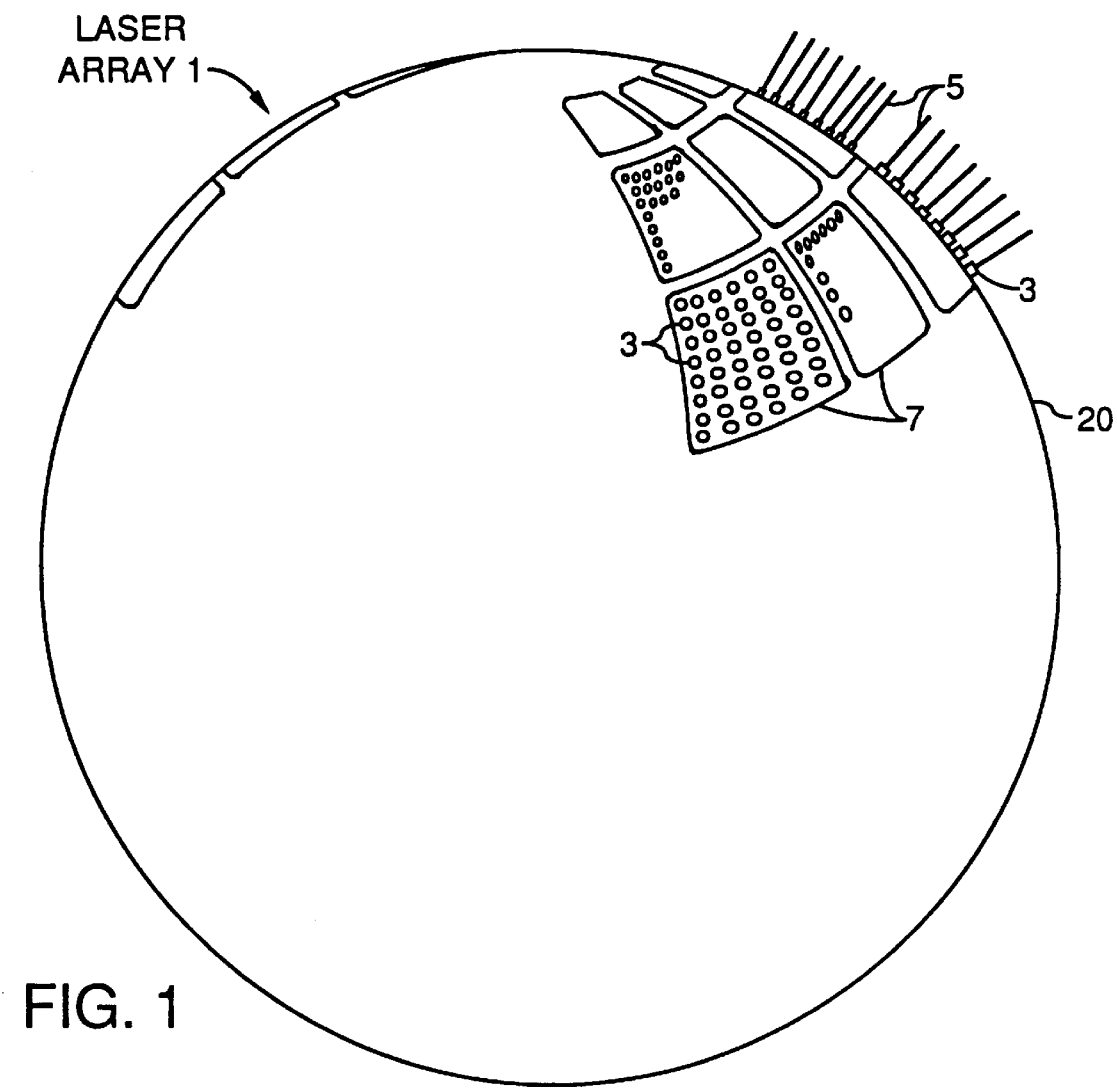
FIG. 1 discloses a multiple field of curved laser arrays of the invention.

The invention employs composite laser array 1, which includes one or more curved arrays 7 of lasers mounted upon spherical surface 20, as shown in FIG. 1. Each laser array 7 typically would include say 100×100 lasers 3. A number of curved arrays 7 can be flexed and mounted anywhere upon the spherical surface 20 to produce a field of multiple arrays which can provide extreme flexibility in laser illuminating directions for numerous applications. Note that one light beam 5 is produced by each laser 3, which is preferably a vertical cavity surface emitting laser or VCSEL, arrays thereof being currently commercially available. They emit a narrow circular beam with low divergence and operate in a single longitudinal mode, and in a single transverse mode for active area diameters of less than about seven microns. Single transverse mode of operation with much larger active areas for larger power output have been realized with new laser designs. See for example, a paper by D. G. Deppe et al., Electronics Letters, Jan. 30, 1997, Vol. 33, No. 3.

Figure 2:
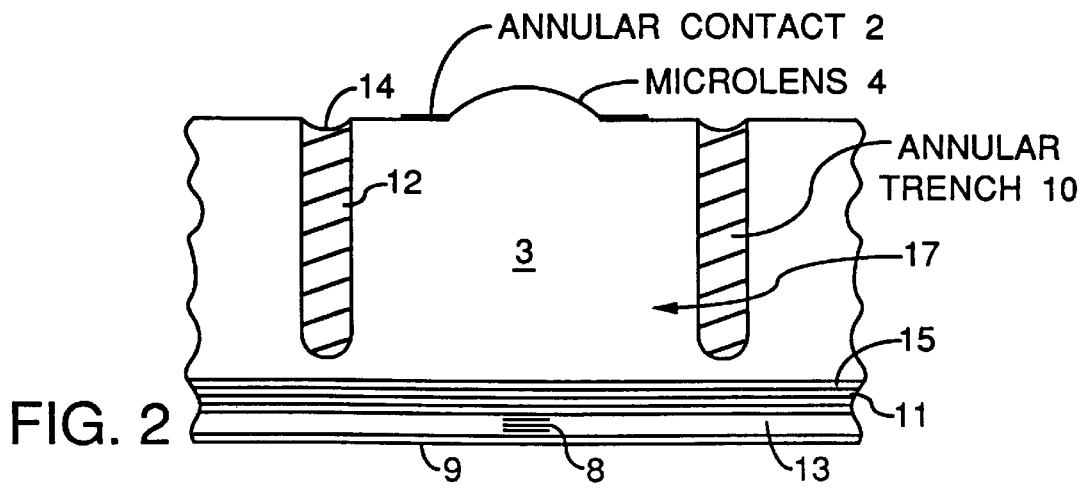
FIG. 2 discloses a single laser of many in the arrays of lasers.

The invention can thus employ prior art arrays of vertical cavity surface emitting lasers 3. One laser 3 of the arrays is illustrated in FIG. 2 and comprises from bottom to top a p-type gold alloy electrical ground plane 9, semiconductor n-doped GaAs mirror layered portion 8, confinement region 11 including quantum well active region 13, semiconductor mirror layered portion 15 similar to portion 8, main GaAs body portion 17 and microlens 4 formed upon the top portion of the laser unit GaAs body portion. Refractive microlens 4, which collimates the slightly diverging beam generated within the lower laser portion, is surrounded by annular contact electrode 2 which is connected to the widely utilized matrix address control circuitry. This structure is known in the art and large arrays of such lasers have been fabricated and successfully operated, and thus further details thereof need not be described. Microlenses 4 have been monolithically integrated with VSCELs to provide satisfactory beam collimation.

A novel annular stress relieving trench 10 of the invention is etched in the main body portion 17 surrounding the laser unit and further facilitates bending or flexing of the laser diode array wafer substrates just before they are mechanically affixed to the spherical surface 20 as shown in FIG. 1. Stress relieving connecting trenches can also be etched between lasers. The array wafer is mounted on the spherically shaped base 20 by applying pressure to the outside edges to flex or bend it and a wafer attachment process can perform the affixing step. Mechanical attachment, soldering, epoxy flip chip bonding or wafer fusion could be employed.

Optionally, annular trench 10 can be filled with a flexible material 12 such as silicone rubber or a polymer such as polyimide. This material has high insulating properties and is used to planarize the arrays. The top of the polymer is made concave at 14 to allow relief for the soft metalized wiring to be positioned thereover for the final connection to the matrix address control circuitry.

Other types of VCSELs may be employed. See for example, a paper by Chunmeng Wu et al., entitled "Novel Circular Grating Surface-Emitting Laser with Emission from Center", Japan Journal of Applied Physics, Vol. 33 (1994) pp. L427–429 Pt. 2, No. 3b, Mar. 15, 1994. In this laser unit, a grating arrangement is used rather than a microlens. Output beams having a beam divergency of less than one degree have been produced, and single transverse mode operation can be attained for large emitting areas compared to standard VCSELs.

Figure 3:
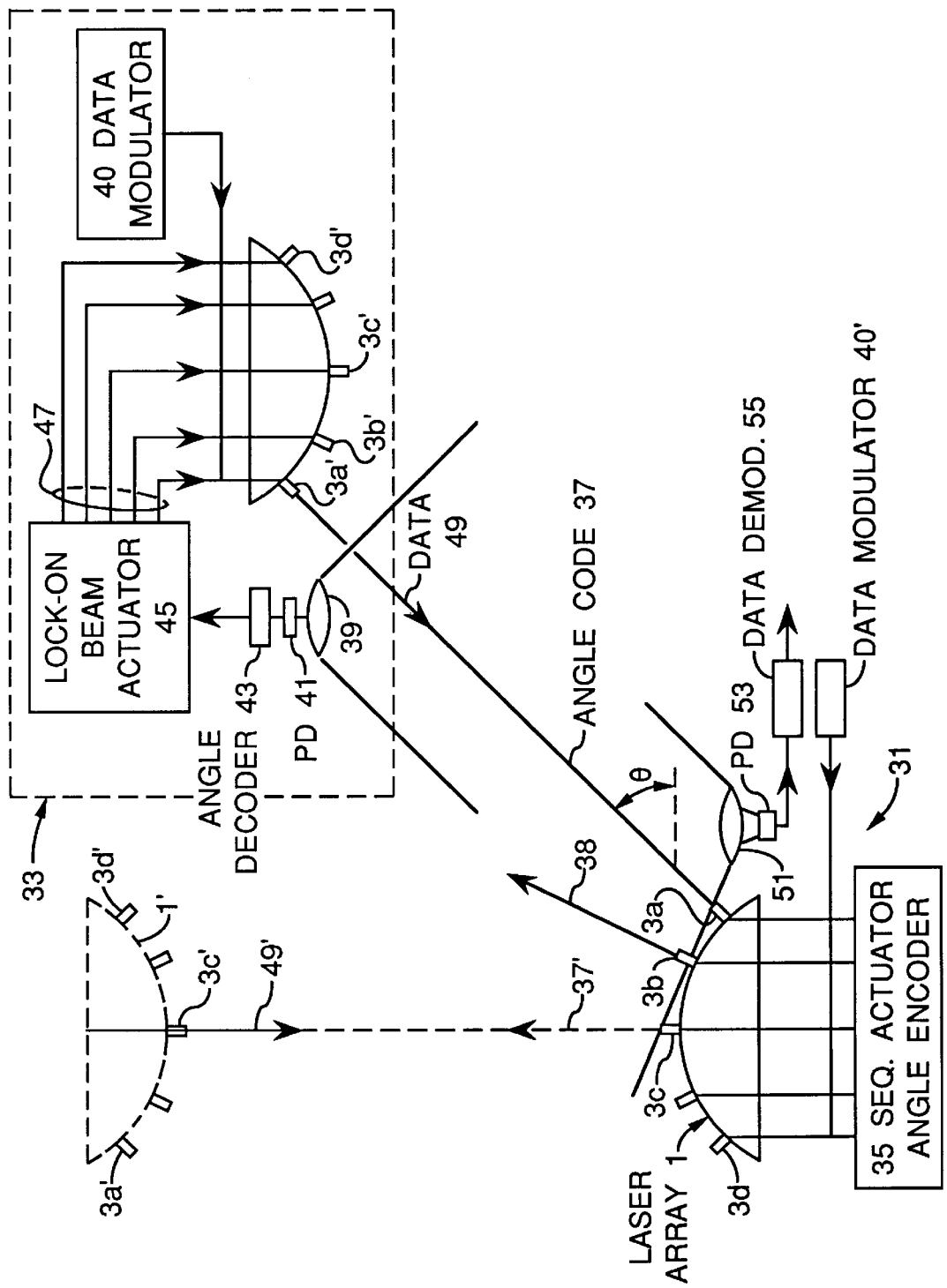
FIG. 3 schematically illustrates a novel data communication system incorporating the optical beam steering device of the invention.

FIG. 3 discloses an exemplary covert data communications system advantageously employing the preferred curved laser array embodiment of the invention. Curved laser array 1 of a first transceiver 31 projects light beams in widely diverse directions in order to covertly communicate with a second transceiver 33, which could be airborne or traveling in outer space. Ground based transceiver 31, could sequentially scan the sky with probe light beams in order to locate the second transceiver 33. Laser actuator 35 sequentially energizes lasers 3 upon the hemispherical surface of curved array 1 and scanning is commenced by emitting light beam 37, which is modulated with and thus bears angle identification code indicia in the form of a binary word for example. For example, angle encoder 35 could impress a binary thirty degree indication on outgoing beam 37, a ninety degree indication on vertical beam 37' and so forth for the remaining beams emitted by the lasers 3 of the curved array 1. In practice there would typically be at least about 100 lasers mounted along the x direction arc upon the laser array hemisphere in the plane of the figure and at least about 100 lasers along the perpendicular y direction arc on the laser array hemisphere and extending into and out of the paper. Other lasers could be positioned between these lasers along intermediate arcs on the hemispheric surface of the laser array 1, to provide a full x-y matrix of lasers.

The second airborne transceiver 33 includes a laser beam lock-on converter/beam actuator 45 coupled between angle indicia decoder 43 and curved laser array 1'. Outgoing ground launched beam 37 is detected by photodetector 41 optically coupled to a wide angle lens 39. The angle identification indicia impressed thereon by ground based angle encoder 35, is decoded by angle decoder 43 coupled to the photodetector, and the output of laser actuator 45 energizes only laser 3a' which is that laser aligned with the transmitting laser 3a on the ground. This causes reply beam 49 to be transmitted directly back along the path of the interrogating beam 37 and a data modulator 40 modulates the reply beam 49 to send data back to the ground station. Laser actuator 45 includes an angle code converter for marking one of n output leads with laser actuating current in accordance with the angle code detected by photodetector 41.

As the second transceiver 33 moves to the left in flight the next outgoing beam 38 will be detected by the photodetector 41 and the new angle code impressed on beam 38 will cause the next laser 3b' rather than laser 3a' to be energized to project the reply beam now aligned with laser 3b. Note that the former beam 37 shown in the figure would no longer be detected by the airborne gyroscope referenced transceiver due to transceiver motion to the left. Thus, aligned pairs of lasers of the ground and airborne laser arrays would sequentially provide the communication link between the two transceivers. When the airborne transceiver is directly overhead, lasers 3c and 3c' would be aligned as shown, to maintain the communication link via emitted beam 37' and reply beam 49'. Later, lasers 3d and 3d' would be aligned when the airborne transceiver is well to the left of the vertical position of the array, indicated by the dotted curved laser array outline shown. Thus, the units shown in the transceiver 33 comprise a beam angle control means for causing the second airborne laser array 1' to transmit a reply beam directly back to the ground transmitter along the same path as the interrogation beam 37 or 38. The transmitted beams are thus locked to the reply beams as the relative position of the transceivers change. The data impressed upon the reply beam 49 by modulator 40 can be demodulated by ground based data demodulator 55, having its input circuit coupled to photodetector 53, in turn optically coupled to viewing lens 51. Data modulator 40 prime with photodetector 53 and lens could cause a data modulated beam to be transmitted to the airborne transceiver for two way data communication if desired. Should the ground based transceiver be employed as a location beacon for the airborne unit, only the angle code modulation of light beams would be required.

It should now be appreciated that since the communicating beams are narrow and discreet and are projected over wide angles in the field of view of at least sixty degrees, the aforesaid benefits of the electronic optical beam steerer requiring no mechanically moving parts are advantageously attained. By adding more arrays to the spherical surface, the field of view can be expanded up to 360 degrees. High speed VCSEL sources provide rapid beam deflection at operating speeds of less than one nanosecond. Other advantageous applications of the invention include non-mechanical beam steering at selected surface portions of optical memory devices such as compact disks.

A communication system similar to this system can be also put to other uses such as collision avoidance systems, as can be appreciated by skilled workers in the art. For example, the first lower transceiver 31 could be mounted upon a first airplane moving to the right and the second upper transceiver 33 could be mounted upon an airplane moving to the left. The differing pairs of sequentially produced IR light beams could be locked together as described above as the airplanes pass by each other. Sequential actuator angle encoder 35 could cause each energized laser to be pulsed, and the round trip time of arrival of the reply beam 49 detected by PD 53 could be readily computed and if a predetermined low round trip time is detected, a collision avoidance device could be immediately actuated to prevent a potential collision. Design of such a device is well within the skill of persons working in the art of collision avoidance, and thus need not be further explained in the interests of brevity and economy.

While preferred embodiment of the invention have been described, others will occur to workers in the art and thus the scope of the invention is to be limited solely by the terms of the claims and art recognized equivalents thereof. For example, each different beam emitted by the laser arrays could have mutually exclusive wavelengths for identifying the beam angles, rather than the aforesaid binary words. Decoder 43 could thus cause laser activation in accordance with wavelength. Also, it may be feasible to replace photodetector 41 with an apertured Hartmann plate having an X-Y array of say 100×100 apertures, and a matrix of photocells behind the apertured plate so that an incoming beam would illuminate only one photocell, thereby identifying its incoming angle and origin on the ground and thus eliminate the need to angle encode the incoming beam. Conceivably, the laser array could be grown directly on a curved surface. Also, the term "laser array" is intended to include one or more laser arrays 7 of FIG. 1 depending upon the extent of the angular view to be covered.

I claim:

1. Optical light beam communication system comprising:
   (a) a first light beam transceiver having a light beam transmitter including
      (a-1) a first laser array of outwardly pointing lasers for transmitting narrow light beams in widely diverging directions within a field of view;
      (a-2) laser actuator means for scanning said field of view by actuating lasers in said first laser array to cause them to transmit discreet light beams therein;
   (b) a second light beam transceiver including
      (b-1) a second laser array of outwardly pointing lasers for transmitting narrow light beams in widely diverse directions;
      (b-2) beam angle control means for causing said second laser array to transmit a reply light beam directly back to said first transceiver.

2. The communication system of claim 1 including means for modulating said reply beam with data to be transmitted to said first transceiver and wherein said first transceiver includes means for demodulating said data carried by said reply beam.

3. The beam steering device of claim 2 wherein said outwardly pointing lasers diverge from each other within a field of view of at least sixty degrees.

4. The beam steering device of claim 3 wherein said first and second laser arrays are formed upon a curved support member.

5. The beam steering device of claim 2 wherein said first and second laser arrays are formed upon a curved support member.

6. The beam steering device of claim 1 wherein said laser actuator means includes a current supply source having a plurality of output conductors, each coupled to an associated one of said outwardly pointing lasers.

7. The beam steering device of claim 6 wherein said first and second laser arrays are formed upon a curved support member.

8. The beam steering device of claim 1 wherein said outwardly pointing lasers diverge from each other within a field of view of at least sixty degrees.

9. The beam steering device of claim 8 wherein said first and second laser arrays are formed upon a curved support member.

10. The beam steering device of claim 1 wherein said first and second laser arrays are formed upon a curved support member.

11. Optical light beam communication system comprising:
    (a) a first light beam transceiver having a light beam transmitter including
       (a-1) a first laser array of outwardly pointing lasers for transmitting narrow light beams in widely diverging directions within a field of view, each beam bearing angle identification indicia indicative of its angle of transmission;
       (a-2) laser actuator means for scanning said field of view by actuating lasers in said first laser array to cause them to transmit discreet light beams therein;
    (b) a second light beam transceiver including
       (b-1) a second laser array means of outwardly pointing lasers for transmitting narrow light beams in widely diverse directions;
       (b-2) beam angle control means for causing said second laser array to transmit a reply light beam directly back to said first transceiver in response to decoding of said beam angle identification indicia transmitted by said first beam.

12. The beam steering device of claim 11 wherein said outwardly pointing lasers diverge from each other within a field of view of at least sixty degrees.

13. The beam steering device of claim 12 wherein said first and second laser arrays are formed upon a curved support member.

14. The beam steering device of claim 11 wherein said first and second laser arrays are formed upon a curved support member.

15. Optical beam steering device comprising:
    a) a curved laser array of outwardly pointing lasers positioned upon a curved laser support means for directing light beams in widely diverging directions;
    b) laser actuator means for steering said light beam by selectively actuating lasers in said curved laser array; and
    c) wherein said laser actuator means includes a current supply source having a plurality of output conductors, each coupled to an associated one of said outwardly pointing lasers.

16. The beam steering device of claim 15 wherein said outwardly pointing lasers diverge from each other within a field of view of at least sixty degrees.

17. The beam steering device of claim 16 wherein said laser actuator means includes a stepping circuit coupled to said output conductors for sequentially energizing lasers of said curved laser array for performing rapid, wide-angle scanning of a field of view.

18. The beam steering device of claim 15 wherein said laser actuator means includes a stepping circuit coupled to said output conductors for sequentially energizing lasers of said curved laser array for performing rapid, wide-angle scanning of a field of view.

19. Optical beam steering device comprising:
    a) a curved laser array of outwardly pointing lasers positioned upon a curved laser support means for directing light beams in widely diverging directions;
    b) laser actuator means for steering said light beam by selectively actuating lasers in said curved laser array; and
    c) wherein said laser actuator means includes means for sequentially energizing lasers of said curved laser array for performing rapid, wide-angle scanning of a field of view.

20. Optical beam steering device comprising:
    a) a laser array of outwardly pointing lasers for directing light beams in widely diverging directions within a field of view of at least sixty degrees;
    b) laser actuator means for steering said light beam by selectively actuating lasers in said curved laser array; and
    c) wherein said laser actuator means includes stepping means for sequentially energizing lasers of said laser array, causing said laser array to perform rapid, wide-angle scanning of said field of view.

21. The beam steering device of claim 20 wherein said laser array is formed within a curved flexible support member.

22. Optical beam steering device comprising:

a) a laser array of outwardly pointing lasers for directing light beams in widely diverging directions within a field of view of at least sixty degrees;

b) laser actuator means for steering said light beam by selectively actuating lasers in said curved laser array; and c) wherein said laser array is formed within a curved flexible support member.

23. Optical beam steering device comprising:

a) a curved laser array of outwardly pointing lasers positioned upon a curved laser support means for directing light beams in widely diverging directions;

b) laser actuator means for steering said light beam by selectively actuating lasers in said curved laser array; and c) wherein an annular trench is formed about each laser of said laser array for enhancing flexibility of said laser array.

24. Optical beam steering device comprising:

a) a laser array of outwardly pointing lasers for directing light beams in widely diverging directions within a field of view of at least sixty degrees;

b) laser actuator means for steering said light beam by selectively actuating lasers in said laser array; and c) wherein an annular trench is formed about each laser of said laser array for enhancing flexibility of said laser array.

* * * * *